3,476,775
RECOVERY OF MALEIC ANHYDRIDE BY PLURAL STAGE THIN LAYER VACUUM EVAPORATION AND PLURAL STAGE CONDENSATION
René Sueur, Bully-Montigny, France, assignor to Societe Chimique des Charbonnages, Paris, France, a French society
Filed Mar. 27, 1968, Ser. No. 716,421
Claims priority, application France, Mar. 30, 1967, 100,799
Int. Cl. C07c *51/56, 57/14*
U.S. Cl. 260—346.8     4 Claims

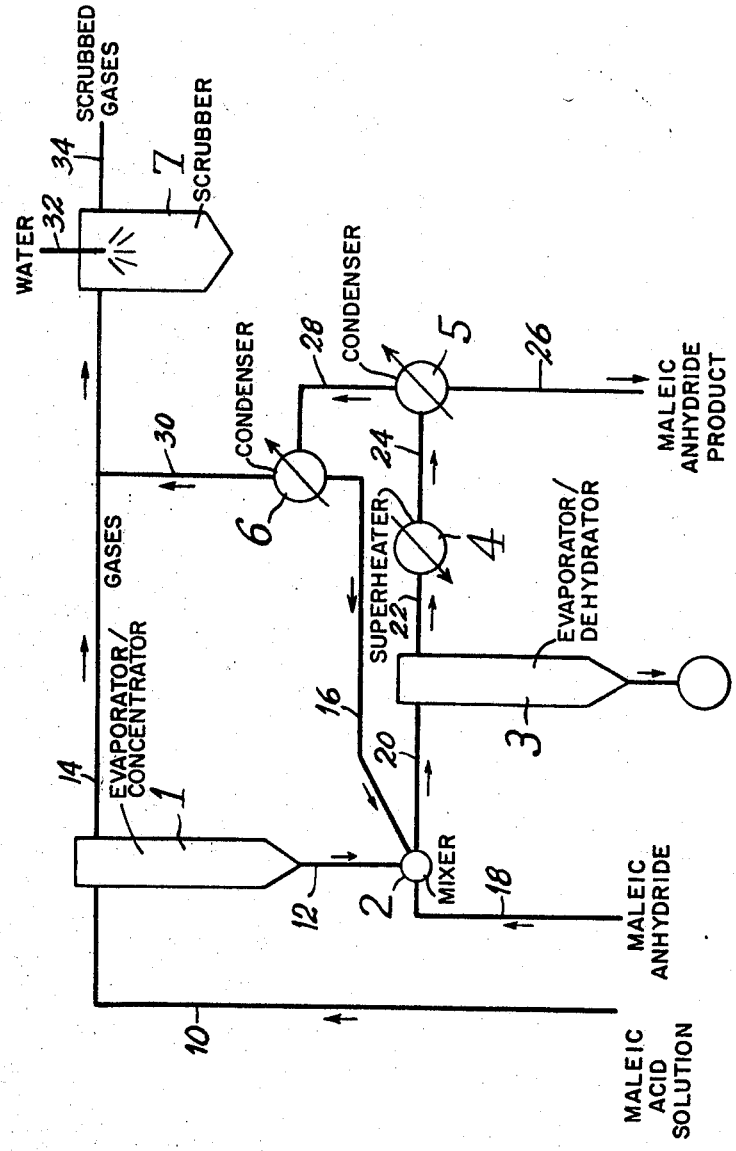

ABSTRACT OF THE DISCLOSURE

A continuous process for the dehydration of maleic acid to form maleic anhydride, which comprises, in a first stage, evaporating a saturated aqueous solution of maleic acid at a temperature of up to 125° C. for a period of less than a minute to remove the water from the solution and to give a molten acid substantially free from water and fumaric acid and, in a second stage, heating a mixture of maleic acid and maleic anhydride in which the ratio (acid)/(anhydride+acid) is from 20 to 40%, to a temperature of up to 160° C. for a period of less than a minute and condensing the maleic anhydride vapor obtained to recover the anhydride.

---

This invention relates to a process of dehydrating maleic acid to form the anhydride thereof.

In the preparation of maleic anhydride by the oxidation of benzene, the gases leaving the reactor are condensed to give liquid maleic anhydride containing from 1 to 3% of maleic acid and the residual gases are finally absorbed in water until a saturated solution of maleic acid, that is one containing about 40% of maleic acid, is formed. In order to obtain high yields of anhydride, it is therefore necessary to convert the maleic acid thus obtained into maleic anhydride. This operation is subject to disadvantages; it necessitates heating to a relatively high temperature and at such temperatures isomerization of the maleic acid to fumaric acid tends to take place and this, in turn, reduces the yield of the process and leads to technological difficulties arising from the high melting point of fumaric acid.

I have now developed an improved process for dehydrating maleic acid to form the anhydride and, according to the invention, this process comprises, in a first stage, evaporating a saturated aqueous solution of maleic acid at a temperature of up to 125° C. for a period of less than a minute to remove the water from the solution and to give a molten acid substantially free from water and fumaric acid and, in a second stage, heating a mixture of maleic acid and maleic anhydride in which the ratio (acid)/(anhydride+acid) is from 20 to 40%, to a temperature of up to 160° C. for a period of less than a minute and condensing the maleic anhydride vapor obtained to recover the anhydride.

The process will now be more fully described with reference to the single figure of the accompanying drawing, which is a diagrammatic representation of a preferred industrial installation for carrying it out.

The installation comprises an evaporator/concentrator 1 in which substantially the whole of the water contained in an approximately 44% aqueous solution of maleic acid is removed. This evaporator operates according to the so-called thin layer method and is designed to evaporate the water from the solution at a temperature of up to 125° C. in less than a minute. It can, if desired, be operated under a partial vacuum.

The molten maleic acid leaving the evaporator 1 is then mixed in a mixer 2 with crude maleic anhydride containing about 3% of maleic acid. The mixture is passed to an evaporator/dehydrator 3 in which it is heated to a temperature of up to 160° C. for less than a minute. The mixture heated in the evaporator/dehydrator 3 must be such that, taking into account the recycling of material from the condenser 6, the maleic acid/anhydride+maleic acid ratio is about from 20 to 40%. If the concentration of maleic anhydride is too low, substantial quantities of fumaric acid are formed in the evaporator and the fumaric acid is deposited on the walls of the apparatus, thus retarding the thermal exchange and tending to block the pipework. If, on the other hand, the concentration of maleic anhydride is too high, the process becomes less interesting from the economic point of view due to an excessive heat requirement with respect to the quantity of maleic anhydride produced.

In the dehydration stage, it is preferred to operate under a partial vacuum, the absolute pressure preferably being from 100 to 300 mm. Hg. Due to the partial vacuum, it is possible to operate the apparatus at a sufficiently low dehydration temperature that, taking into account the time for which the dehydration is effected, the production of undesirable by-products, in particular fumaric acid, is kept low and less than 1% of the treated products. It will be apparent that when the evaporator/dehydrator is operated at a subatmospheric pressure, for example an absolute pressure of 100 to 300 mm. Hg, it is desirable to effect the evaporation of the aqueous acid solution in the evaporator 1 at the same pressure.

The vapors leaving the evaporator/dehydrator are maintained at a temperature of about 150 to 165° C. in a superheater 4 and are then subjected in condensers 5 and 6 to fractional condensation. This condensation is preferably carried out, in the condenser 5, at a temperature of about 110° to 130° C.; the greater part of the maleic anhydride introduced into the installation or produced is recovered in this condenser. This anhydride is practically pure since it contains substantially less than 1% of acid. In the condenser 6, which is preferably operated at a temperature of from 50° to 62° C., the rest of the maleic anhydride is recovered in the form of a mixture containing from 5 to 7% of acid. This mixture is recycled to the mixer 2.

The residual gases are, if desired, scrubbed with water in a scrubber 7.

For a more complete description of the process as illustrated by the sole figure, and aqueous maleic acid solution is fed to concentrator 1 through line 10 and the vapors are withdrawn from the concentrator 14. The molten dehydrated maleic acid is withdrawn from the concentrator through line 12 and fed to mixer 2 where it is admixed with crude maleic anhydride containing 5-7% maleic acid (line 16) and/or maleic anhydride fed through line 18. The mixture of molten maleic acid and maleic anhydride is fed to the dehydrator 3 through line 20 and the vapors are withdrawn through line 22, superheated in superheater 4, and passed to first stage condenser 5 where the greater part of maleic anhydride is recovered and withdrawn through line 26. The vapors from condenser 5 are then passed through line 28 to condenser 6 to obtain overhead gases withdrawn through line 30 and the anhydride acid mixture withdrawn through line 16. The overhead gases in line 30 are combined with those in line 14 and treated with water introduced through line 32 in scrubber 7 to produce scrubbed gases withdrawn through line 34.

The process according to the invention provides a number of technical and economic advantages as compared with the processes previously used. Firstly, it enables crude products such as are obtained in the catalytic oxidation of benzene to be directly treated, secondly, it reduces losses due to isomerisation into fumaric acid and/or the formation of other by-products and, finally, it provides a readily operated continuous process for the production of pure maleic anhydride without the formation of very concentrated residues.

I claim:

1. A continuous process for the dehydration of maleic acid to form maleic anhydride which comprises in a first stage, evaporating a thin layer of a saturated aqueous solution of maleic acid at a pressure not greater than 300 mm. Hg and a temperature up to 125° C. for a period of time less than a minute to remove the water from the solution and to give a molten acid substantially free from water and fumaric acid and, in a second stage, heating a thin layer of a mixture of the molten maleic acid so formed and maleic anhydride in which the ratio (acid)/(anhydride+acid) is from 20 to 40% at a temperature of from 150° to 160° C. for a period of less than a minute and at a pressure not greater than 300 mm. Hg to form maleic anhydride vapor, maintaining the anhydride vapor so formed at 150° to 165° C. for a very brief period, and then condensing the vapor to recover the maleic anhydride so formed.

2. A process according to claim 1, in which both stages are carried out at an absolute pressure of from 100 to 300 mm. Hg.

3. A process according to claim 1 wherein the condensation is carried out in a first condensation stage at a temperature of from 110° to 130° C. and then in a second condensation stage at a temperature of from 50° to 62° C.

4. A process according to claim 3 wherein anhydride obtained from the second condensation stage is combined with the molten acid obtained from the first (evaporation) stage prior to the introduction of said mixture into the second (heating) stage.

References Cited

UNITED STATES PATENTS

| | | | |
|---|---|---|---|
| 1,901,914 | 3/1933 | Livingston | 203—15 |
| 2,670,355 | 2/1954 | Barsky et al. | 203—87 |
| 2,688,622 | 9/1954 | Jaquay | 260—346.8 |
| 2,770,630 | 11/1956 | Miller | 260—346.8 |
| 3,261,847 | 7/1966 | Sullivan | 260—346.8 |

FOREIGN PATENTS 864,139  3/1961  Great Britain.

WILBUR L. BASCOMB, JR., Primary Examiner

U.S. Cl. X.R.

203—15, 42, 78, 80, 87, 89, 98